(12) United States Patent
Tiirola et al.

(10) Patent No.: US 8,565,162 B2
(45) Date of Patent: Oct. 22, 2013

(54) TECHNIQUES FOR IMPROVED ERROR DETECTION IN A WIRELESS COMMUNICATION SYSTEM

(75) Inventors: Esa Tiirola, Kempele (FI); Kari Pajukoski, Oulu (FI); Matti Kiiski, Oulunsalo (FI); Frank Frederiksen, Klarup (DK); Troels E. Kolding, Klarup (DK); Bernhard Raaf, Neuried (DE)

(73) Assignee: Nokia Corporation, Espoo (FI)

( * ) Notice: Subject to any disclaimer, the term of this patent is extended or adjusted under 35 U.S.C. 154(b) by 1344 days.

(21) Appl. No.: 12/077,233

(22) Filed: Mar. 18, 2008

(65) Prior Publication Data

US 2008/0232321 A1 Sep. 25, 2008

Related U.S. Application Data

(60) Provisional application No. 60/919,048, filed on Mar. 19, 2007.

(51) Int. Cl.
*H04W 4/00* (2009.01)
*H04B 3/36* (2006.01)
*H04W 72/00* (2009.01)

(52) U.S. Cl.
USPC ............ 370/329; 370/330; 455/8; 455/450; 455/452.1

(58) Field of Classification Search
USPC ................................. 370/329–330
See application file for complete search history.

(56) References Cited

U.S. PATENT DOCUMENTS

| | | | |
|---|---|---|---|
| 7,006,464 B1 * | 2/2006 | Gopalakrishnan et al. | 370/328 |
| 7,142,864 B2 * | 11/2006 | Laroia et al. | 455/450 |
| 7,392,014 B2 * | 6/2008 | Baker et al. | 455/67.11 |
| 7,957,345 B2 * | 6/2011 | Yang et al. | 370/329 |
| 2004/0137906 A1 * | 7/2004 | Nakao et al. | 455/450 |
| 2005/0286408 A1 * | 12/2005 | Jin et al. | 370/208 |
| 2006/0195576 A1 | 8/2006 | Rinne et al. | 709/226 |
| 2007/0115972 A1 * | 5/2007 | Jang et al. | 370/389 |
| 2008/0273610 A1 * | 11/2008 | Malladi et al. | 375/260 |
| 2009/0080351 A1 * | 3/2009 | Ryu et al. | 370/312 |

FOREIGN PATENT DOCUMENTS

| | | |
|---|---|---|
| CN | 1260658 A | 7/2000 |
| EP | 1 631 015 A1 | 3/2004 |
| GB | 2 347 585 | 12/1999 |
| GB | 2347585 A * | 9/2000 |
| WO | WO 2006/070992 A1 | 7/2006 |
| WO | WO 2006/104353 A2 | 10/2006 |

* cited by examiner

*Primary Examiner* — Huy C Ho

(74) *Attorney, Agent, or Firm* — Harrington & Smith

(57) ABSTRACT

In one exemplary embodiment of the invention, a method including: determining whether first allocation information has been transmitted from a first device towards a second device in a wireless communication system; and transmitting a message including transmittal information and second allocation information from the first device towards the second device, wherein the transmittal information corresponds to the determined transmittal of the first allocation information. In another exemplary embodiment of the invention, a method including: detecting whether a first signal is received on a dedicated resource of a wireless communication system; detecting whether a second signal is received on a shared resource of the wireless communication system; and determining, based on a detection outcome for the first signal and a detection outcome for the second signal, whether at least one allocation has failed.

31 Claims, 7 Drawing Sheets

|  | UL AT | |
|---|---|---|
| DL AT | NOT FAILED | FAILED |
| NOT FAILED | D | S |
| FAILED | X | 0 |

D = ONLY DEDICATED SIGNAL DETECTED
S = ONLY SHARED SIGNAL DETECTED
0 = NEITHER SIGNAL DETECTED
X = NOT APPLICABLE

TECHNIQUES FOR IMPROVED ERROR DETECTION IN A WIRELESS COMMUNICATION SYSTEM

CROSS-REFERENCE TO RELATED APPLICATIONS

This patent application claims priority under 35 U.S.C. §119(e) from U.S. Provisional Patent Application No. 60/919,048, filed Mar. 19, 2007, the disclosure of which is incorporated by reference herein in its entirety.

TECHNICAL FIELD

The exemplary and non-limiting embodiments of this invention relate generally to wireless communication systems, apparatus, methods and computer program products and, more specifically, relate to error detection.

BACKGROUND

The following abbreviations are utilized herein:
3GPP third generation partnership project
ACK acknowledgement
A/N ACK/NACK
ARQ automatic repeat-request
AT allocation table
BS base station
CAZAC constant amplitude zero autocorrelation
CDM code division multiplexing
CQI channel quality indicator
CRC cyclic redundancy check
DFT discrete Fourier transform
DL downlink (Node B to UE)
DTX discontinuous transmission
E-UTRAN evolved universal terrestrial radio access network (LTE)
HARQ hybrid automatic repeat-request
L1 layer 1 (physical layer, PHY)
LTE long term evolution of UTRAN (E-UTRAN)
MIMO multiple input/multiple output
NACK negative acknowledgement
Node B base station
OFDM orthogonal frequency division multiplexed
OFDMA orthogonal frequency division multiple access
PRB physical resource block
RLC radio link control
RS reference signal
SINR signal to interference-plus-noise ratio
SNR signal to noise ratio
TDM time division multiplexed
TTI transmission time interval
UE user equipment, such as a mobile station or mobile terminal
UL uplink (UE to Node B)
UMTS universal mobile telecommunications system
UTRAN universal terrestrial radio access network A proposed communication system known as E-UTRAN or LTE is currently under discussion within the 3GPP. The E-UTRAN system is a packet-based system that operates under strict control by the BS (Node B). The usage of physical UL/DL resources is signaled from the Node B to the UE, typically in each TTI. The signaling is realized by use of UL and DL ATs. The UL and DL ATs indicate to the UE which physical resources are assigned for UL and DL data transmissions, respectively. When data transmission occurs over a wireless medium, there is a risk of error when receiving and detecting the data.

From the point of view of the UL, there are a number of potential signaling errors:
(1) The UL allocation fails and only the UL allocation was sent.
(2) The DL allocation fails and only the DL allocation was sent.
(3) Both UL and DL allocations fail.
(4) The DL allocation fails but the UL allocation does not.
(5) The UL allocation fails but the DL allocation does not.

A working assumption in the 3GPP is that the UL and DL ATs are separately encoded (e.g., error (1) or (2)). Error (3) may occur, for example, in the situation where the UL and DL ATs are jointly coded. The error rate related to the resource allocation signaling is assumed to be on the order of 1%-5%.

Note that the ACK/NACK for the data packet that is indicated by the DL AT will likely be associated with a different TTI than the ACK/NACK for the UL AT (e.g., UL data). This is due to the fact that ACK/NACK signaling cannot be transmitted until the corresponding DL data packet has been decoded. This is in contrast to the UL data since the UL data can be transmitted immediately once the UL AT has been correctly received.

It is noted that when a UE fails to decode the UL/DL AT, it does not realize that there was a resource allocation for the UE.

In RAN1 meeting #46bis held in Seoul, some working assumptions related to the UL control signaling were agreed on. Related to the data-non-associated control signal (e.g., ACK/NACK, CQI) transmission in the absence of UL data, the working assumption is to use a reserved frequency and time resource for control signaling (a "shared control resource"). In RAN meeting #47bis held in Sorrento, CDM was agreed on as a working assumption for the multiple access method between UEs simultaneously transmitting only control signaling. It has also been agreed that control and data are multiplexed prior to DFT (e.g., TDM) when both UL data and data-non-associated control signals are present. In that case, the data-non-associated control signals are transmitted with UL data on dedicated resources.

SUMMARY

The below summary section is intended to be merely exemplary and non-limiting.

In one exemplary embodiment of the invention, a method comprising: determining whether first allocation information has been transmitted from a first device towards a second device in a wireless communication system; and transmitting a message comprising transmittal information and second allocation information from the first device towards the second device, wherein the transmittal information corresponds to the determined transmittal of the first allocation information.

In another exemplary embodiment of the invention, a program storage device readable by a machine, tangibly embodying a program of instructions executable by the machine for performing operations, said operations comprising: determining whether first allocation information has been transmitted from a first device towards a second device in a wireless communication system; and transmitting a message comprising transmittal information and second allocation information from the first device towards the second device, wherein the transmittal information corresponds to the determined transmittal of the first allocation information.

In another exemplary embodiment of the invention, an apparatus comprising: a data processor configured to determine whether first allocation information has been transmitted towards another apparatus; and a transmitter configured to transmit a message comprising transmittal information and second allocation information towards the other apparatus, wherein the transmittal information corresponds to the determined transmittal of the first allocation information.

In another exemplary embodiment of the invention, a method comprising: detecting whether a first signal is received on a dedicated resource of a wireless communication system; detecting whether a second signal is received on a shared resource of the wireless communication system; and determining, based on a detection outcome for the first signal and a detection outcome for the second signal, whether at least one allocation has failed.

In another exemplary embodiment of the invention, a program storage device, readable by a machine, tangibly embodying a program of instructions executable by the machine for performing operations, said operations comprising: detecting whether a first signal is received on a dedicated resource of a wireless communication system; detecting whether a second signal is received on a shared resource of the wireless communication system; and determining, based on a detection outcome for the first signal and a detection outcome for the second signal, whether at least one allocation has failed.

In another exemplary embodiment of the invention, an apparatus comprising: a first receiver; a first detector configured to detect whether a first signal is received by the first receiver on a dedicated resource; a second receiver; a second detector configured to detect whether a second control signal is received by the second receiver on a shared resource; and a data processor configured to determine, based on a detection outcome for the first signal and a detection outcome for the second control signal, whether at least one allocation has failed.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
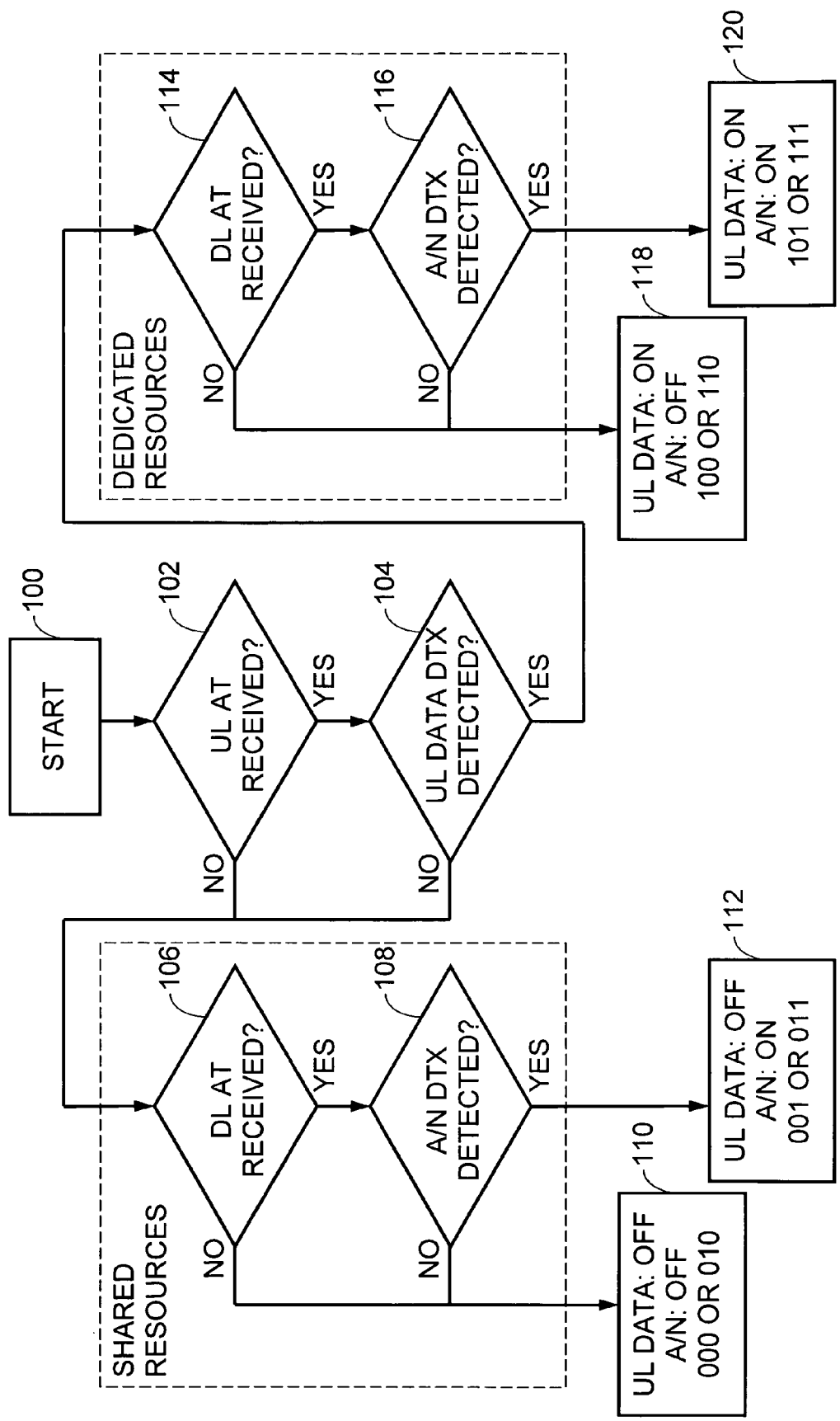
FIG. 1 depicts a flowchart illustrating one non-limiting example of a procedure the Node B can employ to determine which signals the Node B should have received from a UE.

The implications of UL/DL AT signaling errors are considered below.

UL Allocation (AT) Fails: The scheduled UL data will not be transmitted (DTX) until the failure has been detected and the correct UL AT has been transmitted and received. It is possible for data-non-associated control signals (e.g., CQI, ACK/NACK) to be sent using one or more shared control resources instead of dedicated resources. If the receiver design is not good enough, periodic CQI may also be lost.

DL Allocation (AT) Fails: DL data will be lost. The Node B will be trying to detect an ACK/NACK that has not been sent (DTX for ACK/NACK). There will be problems with DL HARQ operation. That is, if the DL AT failure is not detected by the Node B, then a HARQ (re-)transmission will be missing. If the control signal multiplexing design is not good enough, UL data and periodic CQI may also be lost. If the UL AT is received correctly, it is possible for data-non-associated control signals (e.g., CQI, ACK/NACK) to be sent using one or more dedicated control resources instead of shared resources.

Both UL and DL ATs Fail: Both UL and DL data will be lost.

There are two assumptions that should be noted regarding UL control signal transmission. It is assumed that periodic CQI is free from signaling errors. For example, in the case where both UL and DL fail, it is assumed that periodic CQI remains unaffected and is received correctly. It is further assumed that additional data-associated signaling is not used to signal the actual UL control signaling format. That is, no additional signaling is used to specify whether or not ACK/NACK is present (e.g., multiplexed with the UL data).

In order for the Node B to receive the control signals properly (i.e., on the correct frequency/time resource(s)), the Node B should be able to identify possible signaling errors. This enables the Node B to respond to and account for signaling errors, for example, by transmitting on different resources or by knowing to look elsewhere for various signals (e.g., ACK/NACK, CQI). Thus, it is desirable to identify the actual control signaling format (DTX detection), at least to some extent. It is also desirable to design and utilize multiplexing schemes that minimize problems caused by erroneous DTX detection.

TABLE 1

| Data | CQI | ACK/NACK | Shared/Dedicated | Solution |
|---|---|---|---|---|
| − | − | − |  | Nothing to send |
| − | − | + | Shared | CAZAC sequence modulation (+block spreading) |
| − | + | − | Shared | DFT-S-OFDMA (block spreading) |
| − | + | + | Shared | DFT-S-OFDMA (block spreading, symbol multiplexing) |
| + | − | − | Dedicated | DFT-S-OFDM |
| + | − | + | Dedicated | DFT-S-OFDMA (block spreading, symbol multiplexing) |
| + | + | − | Dedicated | DFT-S-OFDMA (block spreading, symbol multiplexing) |
| + | + | + | Dedicated | DFT-S-OFDMA (block spreading, symbol multiplexing) |

Table 1 depicts exemplary solutions for the various combinations of data, CQI and ACK/NACK. A "+" in one of the first three columns indicates the presence of UL data, CQI and/or ACK/NACK, respectively, while a "—" indicates absence of the same.

The above-described errors can be represented in a table (e.g., Table 2) using binary notation. As a non-limiting example, three bits can be used to indicate the on/off state (i.e., presence/absence) of the UL data, CQI and ACK/NACK, respectively. For example, based on the order of columns in Table 1, a value of 001 may be used to indicate that there is no UL data or CQI (neither has been received), but there is an ACK/NACK (an ACK/NACK was received). This notation may also be used to represent the signals that the Node B should have received, should look for or should transmit.

TABLE 2

| Signal Combination Assumed by Node B | Actual Signal Combination | | | |
|---|---|---|---|---|
| | Correct AT | UL AT Fails | DL AT Fails | UL & DL AT Fail |
| 000 | 000 | — | — | — |
| 001 | 001 | — | 000 | — |
| 010 | 010 | — | — | — |
| 011 | 011 | — | 010 | — |
| 100 | 100 | 000 | — | — |
| 101 | 101 | 001 | 100 | 000 |
| 110 | 110 | 010 | — | — |
| 111 | 111 | 011 | 110 | 010 |

In other words, if the UL AT fails, no UL data will be received by the Node B. If the DL AT fails, no ACK/NACK will be received by the Node B. Table 2 shows that in the event of an UL/DL AT failure, unless the Node B learns of the failure and accounts for it, the Node B will not be able to receive the correct information, for example, through alternative means (e.g., other channels or resources).

Although shown in Table 2 with the CQI, since it is assumed that the CQI is unaffected by AT failures, the possible signal combinations can be reduced to four pairs of outcomes, as shown in Table 3 below. Each column of Table 3 represents a singular outcome since the two values in each column (the pair of signal combinations) only differ in the presence or absence of CQI. Note that CQI may be configured to be transmitted periodically at known times (e.g., known prior to transmission). In such a case, there will not be a misunderstanding about whether CQI is present or absent.

TABLE 3

| | UL Data: OFF ACK/NACK: OFF | UL Data: OFF ACK/NACK: ON | UL Data: ON ACK/NACK: OFF | UL Data: ON ACK/NACK: ON |
|---|---|---|---|---|
| CQI: OFF | 000 | 001 | 100 | 101 |
| CQI: ON | 010 | 011 | 110 | 111 |

FIG. 1 depicts a flowchart illustrating one non-limiting example of a procedure the Node B can employ to determine which signals the Node B should have received from a UE. Starting at box 100, first, the Node B inquires whether an UL AT was received (box 102). Note that if an UL AT is not received and decoded, the Node B cannot receive any UL data. If an UL AT has not been received (NO at box 102), the process proceeds to box 106. If an UL AT has been received (YES at box 102), the Node B inquires whether an UL data DTX has been detected (box 104). Note that even if an UL AT has been received, data may not have been sent on the UL (i.e., no UL data DTX would be detected). If an UL data DTX is not detected (NO at box 104), the process proceeds to box 106. If an UL data DTX is detected (YES at box 104), the process proceeds to box 114.

If the process of FIG. 1 proceeds to box 106, the possible data-non-associated control channels can be received by the Node B on shared resources. At box 106, the Node B inquires whether the DL AT was received by the UE. That is, the Node B checks to see if the UE sent an ACK for the DL AT. If a DL AT was not received by the UE (NO at box 106, no ACK from UE), then the outcome is box 110 and the signal combination is 010 or 000, depending on whether CQI is on (present) or off (absent), respectively. If a DL AT was received by the UE (YES at box 106, ACK from UE), the process proceeds to box 108 where the Node B inquires whether an ACK/NACK (A/N) DTX is detected. If an ACK/NACK DTX is not detected (NO at box 108), the outcome is box 110. If an ACK/NACK DTX is detected (YES at box 108), the outcome is box 112 and the signal combination is 011 or 001, depending on whether CQI is on (present) or off (absent), respectively.

If the process of FIG. 1 proceeds to box 114, the possible data-non-associated control channels can be received by the Node B on dedicated resources. At box 114, the Node B inquires whether the DL AT was received by the UE. That is, the Node B checks to see if the UE sent an ACK for the DL AT. If a DL AT was not received by the UE (NO at box 114, no ACK from UE), then the outcome is box 118 and the signal combination is 110 or 100, depending on whether CQI is on (present) or off (absent), respectively. If a DL AT was received by the UE (YES at box 114, ACK from UE), the process proceeds to box 116 where the Node B inquires whether an ACK/NACK (A/N) DTX is detected. If an ACK/NACK DTX is not detected (NO at box 116), the outcome is box 118. If an ACK/NACK DTX is detected (YES at box 116), the outcome is box 120 and the signal combination is 111 or 101, depending on whether CQI is on (present) or off (absent), respectively.

UL data DTX detection is generally a significant operation since it determines on which type of resource (shared or dedicated) the possible data-non-associated control channels can be received by the Node B. For example, if the UL AT fails, then the DL control channel(s) (e.g., ACK/NACK, CQI) will be transmitted on a shared control resource. As another non-limiting example, if the UL AT is correctly received, the control signal(s) will be TDM with UL data and transmitted on a dedicated resource. As non-limiting examples, the UL data DTX detection can be based on a SNR or SINR measurement of one or more pilot and/or data signals (e.g., a threshold detector).

Figure 2:
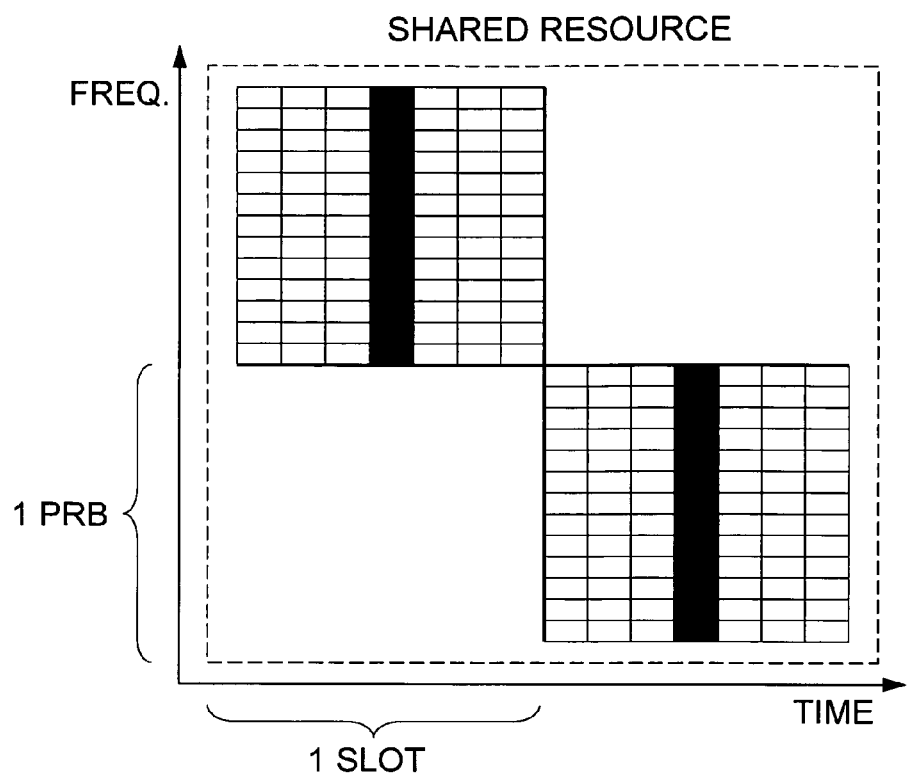
FIG. 2 shows one non-limiting example of shared resources suitable for control signal transmission.
Figure 3:
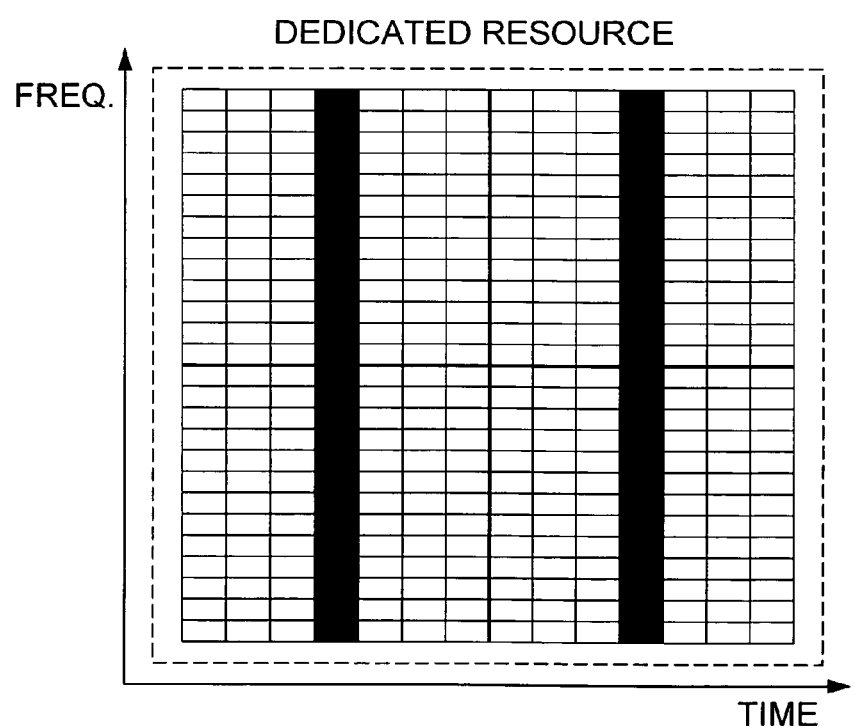
FIG. 3 depicts one non-limiting example of dedicated resources suitable for control signal transmission.

FIG. 2 shows one non-limiting example of shared resources suitable for control signal transmission as explained above. FIG. 3 depicts one non-limiting example of dedicated resources suitable for control signal transmission as explained above. Note that the control signals may be multiplexed with UL data, also as explained above.

As may be appreciated from the above discussion, the potential failure of a component (e.g., UL AT, DL AT, UL data DTX detection) and subsequent effects thereof are significant issues to take into account when designing a wireless communication system. It is very desirable for a device (e.g., the base station/Node B) to be able to accurately determine if and when a failure has occurred and react accordingly. Without suitable and effective recovery techniques, it is very likely that information (e.g., control signals, data) will be lost and/or misinterpreted by the device.

The further consequences of various failures, in addition to techniques that may be used to address them, are considered separately below.

If the UL AT fails, then the possible data-non-associated control channels (e.g., ACK/NACK, CQI) can be transmitted on a shared control resource. In such a case, and in the absence of any corrective information (e.g., UL data DTX detection), the Node B would still be assuming that the control signals will arrive via dedicated resources. By using an UL data DTX detector, the Node B can identify whether or not the UL data is present (i.e., whether or not the UL AT failed). However, if the UL data DTX detection fails, it can cause severe problems. In the event of a failure, the UL data DTX detector might indicate that UL data is present although it is not or that UL data is absent when it is present. In both cases, control signals are received from the wrong place, increasing the risk that a NACK or DTX is interpreted as an ACK. In addition, UL data will be lost. There is also a possibility that CQI will be lost. UL data DTX detection failure is generally the worst type of failure since higher layer error recovery (e.g., RLC retransmission), which is generally a slow operation and causes significant overhead, may be needed.

In one non-limiting, exemplary embodiment of the invention, improved DTX detection techniques, and devices/components, are provided. If the UL AT fails or if a CRC of the UL AT is negative while the corresponding DL AT has been correctly received by the UE or the UE has periodic control information (e.g., CQI) to be transmitted, as noted above, the UE can transmit the control signals on shared control resources. Therefore, it is desirable to determine if the UL AT has been correctly received by the UE, said determination being based on DTX detection.

In order to improve DTX detection, both shared control resources and dedicated resources are received by the Node B. That is, reception of the shared control channel is performed even though, in the absence of an UL AT failure, the shared control signaling resource should not be in use.

By receiving both shared control resources and dedicated resources, the improved DTX detector can utilize both signals, for example, by having two decision variables with one variable for each type of resource. The decision variable indicates whether or not a signal is present for that resource (e.g., the decision variable can be a binary value). This will significantly decrease the probability of UL data DTX detection failure. This will concurrently improve the quality of data and control signal transmission.

Consider two decision variables, one each for shared control resources and dedicated resources, identified below as a shared variable and dedicated variable, wherein the decision variables are binary values that indicate the presence (1) or absence (0) of a signal in the corresponding resource. Four outcomes are possible, discussed immediately below with reference to outcomes (a)-(d), FIG. 4 and Table 4. Note that this is provided as one non-limiting, exemplary embodiment of the invention.

In the discussion below, it is assumed that the UL TTI comprises both data-non-associated control signals (e.g., ACK/NACK, CQI) and UL data.

Figures 4, 5:
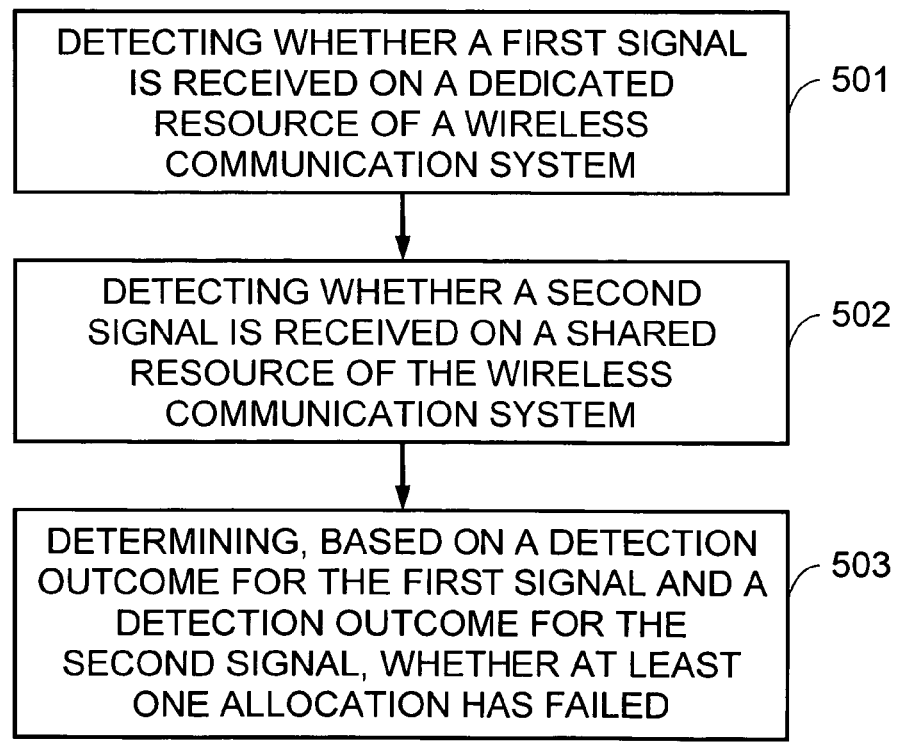
FIG. 4 shows a diagram of the signals, shared or dedicated, that would be detected based on the potential failure of the UL AT and/or the DL AT in accordance with aspects of the exemplary embodiments of the invention.
FIG. 5 depicts a flowchart illustrating one non-limiting example of a method for practicing the exemplary embodiments of this invention.

FIG. 4 shows a diagram of the signals, shared or dedicated, that would be detected based on the potential failure of the UL AT and/or the DL AT in accordance with aspects of the exemplary embodiments of the invention. Detecting a signal only on dedicated resources (a "dedicated signal") indicates that the UL AT has not failed. Detecting a signal only on shared resources (a "shared signal") indicates that the UL AT has failed while the DL AT has not failed. Detecting neither a dedicated signal nor a shared signal indicates that both the UL AT and the DL AT have failed. Note that since the focus is on the failure of the UL AT, the case where the UL AT has not failed and the DL AT has failed ("X" in FIG. 4) is not considered. In that case, because the UL AT has not failed, the control signals would be transmitted as anticipated (i.e., on dedicated resources), regardless of whether or not the DL AT has failed.

TABLE 4

| D | S | Outcome | Determination |
|---|---|---------|---------------|
| 1 | 0 | (a)     | UL AT not failed. |
| 0 | 1 | (b)     | UL AT failed; DL AT not failed. |
| 0 | 0 | (c)     | UL AT failed, DL AT failed. |
| 1 | 1 | (d)     | Likely at least UL AT failed. |

Table 4 shows the four outcomes and corresponding determinations from the four possible combinations of detecting the presence or absence of signals on shared resources and dedicated resources. The outcomes are further discussed immediately below.

(a) Dedicated variable indicates a data signal is present; shared variable indicates a control signal is not present. The UL AT has not failed since a signal is transmitted on dedicated resources as anticipated.

(b) Dedicated variable indicates a data signal is not present; shared variable indicates a control signal is present. The UL AT has failed and the DL AT has not failed. That is, due to the failure of the UL AT, a control signal is transmitted on a shared resource. The reception of the control signal on the shared resource indicates that the DL AT is functioning correctly.

(c) Dedicated variable indicates a data signal is not present; shared variable indicates a control signal is not present. Assuming that control signals were transmitted, at least the UL AT has failed. It is probable that the DL AT has also failed.

(d) Dedicated variable indicates a data signal is present; shared variable indicates a control signal is present. In this outcome, the signals are in conflict. It is likely that at least the UL AT has failed.

As non-limiting examples, the dedicated resource may be one used for data transmission while the shared resource may be one used for the transmission of an ACK/NACK or CQI. In such a case, the possible combinations include: data+ACK/NACK, data+CQI and data+CQI+ACK/NACK.

It may be the case that control channel multiplexing is based on using cyclic shifts of CAZAC codes. As noted above, it has already been agreed in the 3GPP that CDM will be used as the multiplexing scheme between different UEs transmitting only control signals. Due to the properties of cyclic shifts of CAZAC codes, reception of the shared resource is generally straight-forward. This is a beneficial aspect since the above-described exemplary embodiment receives the shared resource. As such, there is relatively little additional complexity (e.g., for the Node B) due to the reception of the shared resource.

Generally, the above-described exemplary embodiment increases the robustness of systems by increasing the probability of identifying UL AT failure. Concurrently, the exemplary embodiment also provides faster recovery in the event of an UL AT failure. In addition, the probability of receiving control signals from the wrong resource (e.g., type of resource, wrong location) is decreased, thus also reducing the risk that a DTX is misinterpreted (e.g., as an ACK). Similarly, the probability of miscommunication, such as an ACK/NACK or CQI getting through even though the UL AT has failed, for example, is reduced. The additional complexity for implementing the exemplary embodiment is relatively minor, as noted above.

Figure 6:
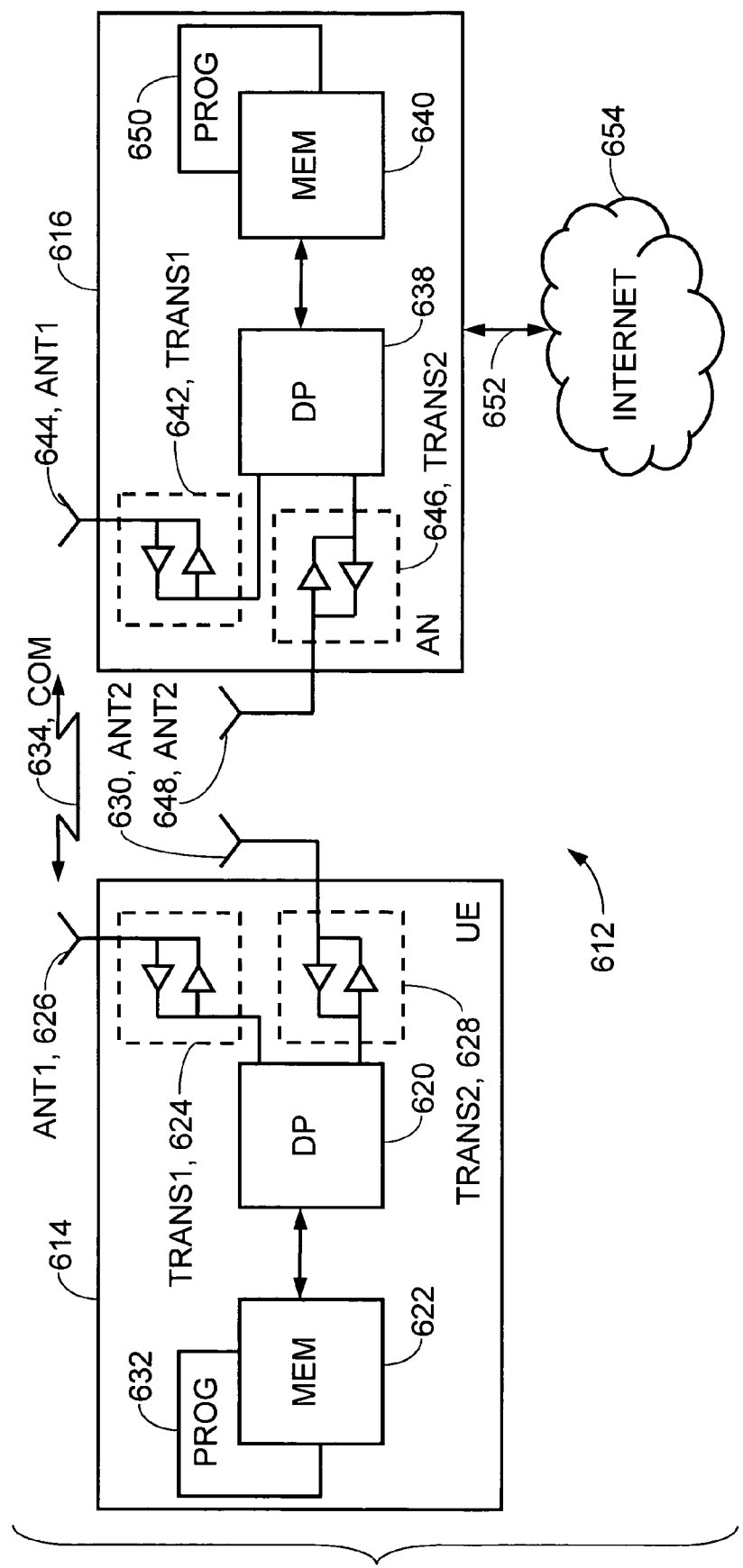
FIG. 6 shows a simplified block diagram of various electronic devices that are suitable for use in practicing the exemplary embodiments of this invention

Reference is made to FIG. 6 for illustrating a simplified block diagram of various electronic devices that are suitable for use in practicing the exemplary embodiments of this invention. In FIG. 6, a wireless network 612 is adapted for communication with a user equipment (UE) 614 via an access node (AN) 616.

The UE 614 includes: a data processor (DP) 620; a memory (MEM) 622 coupled to the DP 620; a suitable first RF transceiver (TRANS1) 624 (having a transmitter (TX) and a receiver (RX)) coupled to the DP 620; a first antenna (ANT1) 626 coupled to the TRANS1 624; a suitable second RF transceiver (TRANS2) 628 (having a transmitter (TX) and a receiver (RX)) coupled to the DP 620; and a second antenna (ANT2) 630 coupled to the TRANS2 628. The MEM 622 stores a program (PROG) 632. The TRANS1 624 and TRANS2 628 are both capable of bidirectional wireless communication, such as a communication (COM) 634, with the AN 616.

The AN 616 includes: a data processor (DP) 638; a memory (MEM) 640 coupled to the DP 638; a suitable first RF transceiver (TRANS1) 642 (having a transmitter (TX) and a receiver (RX)) coupled to the DP 638; a first antenna (ANT1) 644 coupled to the TRANS1 642; a suitable second RF transceiver (TRANS2) 646 (having a transmitter (TX) and a receiver (RX)) coupled to the DP 638; and a second antenna (ANT2) 648 coupled to the TRANS2 646. The MEM 640 stores a program (PROG) 650. The TRANS1 642 and the TRANS2 646 are both capable of bidirectional wireless communication, such as the COM 634, with the UE 614. The AN 616 may be coupled via a data path 652 to one or more external networks or systems, such as the internet 654, for example.

In some exemplary embodiments, the transceivers 624, 628, 642, 646 and antennas 626, 630, 644, 648 of the UE 614 and AN 616 may be utilized for MIMO communications via the COM 634. In other exemplary embodiments, the COM 634 may comprise a non-MIMO communication.

At least one of the PROGs 632, 650 is assumed to include program instructions that, when executed by the associated DP, enable the electronic device to operate in accordance with the exemplary embodiments of this invention, as discussed herein.

In general, the various embodiments of the UE 614 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 620, 638 of the UE 614 and the AN 616, or by hardware, or by a combination of software and hardware.

The MEMs 622, 640 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 620, 638 may be of any type suitable to the local technical environment, and may include one or more of general purpose computers, special purpose computers, microprocessors, digital signal processors (DSPs) and processors based on a multi-core processor architecture, as non-limiting examples.

Figure 8:
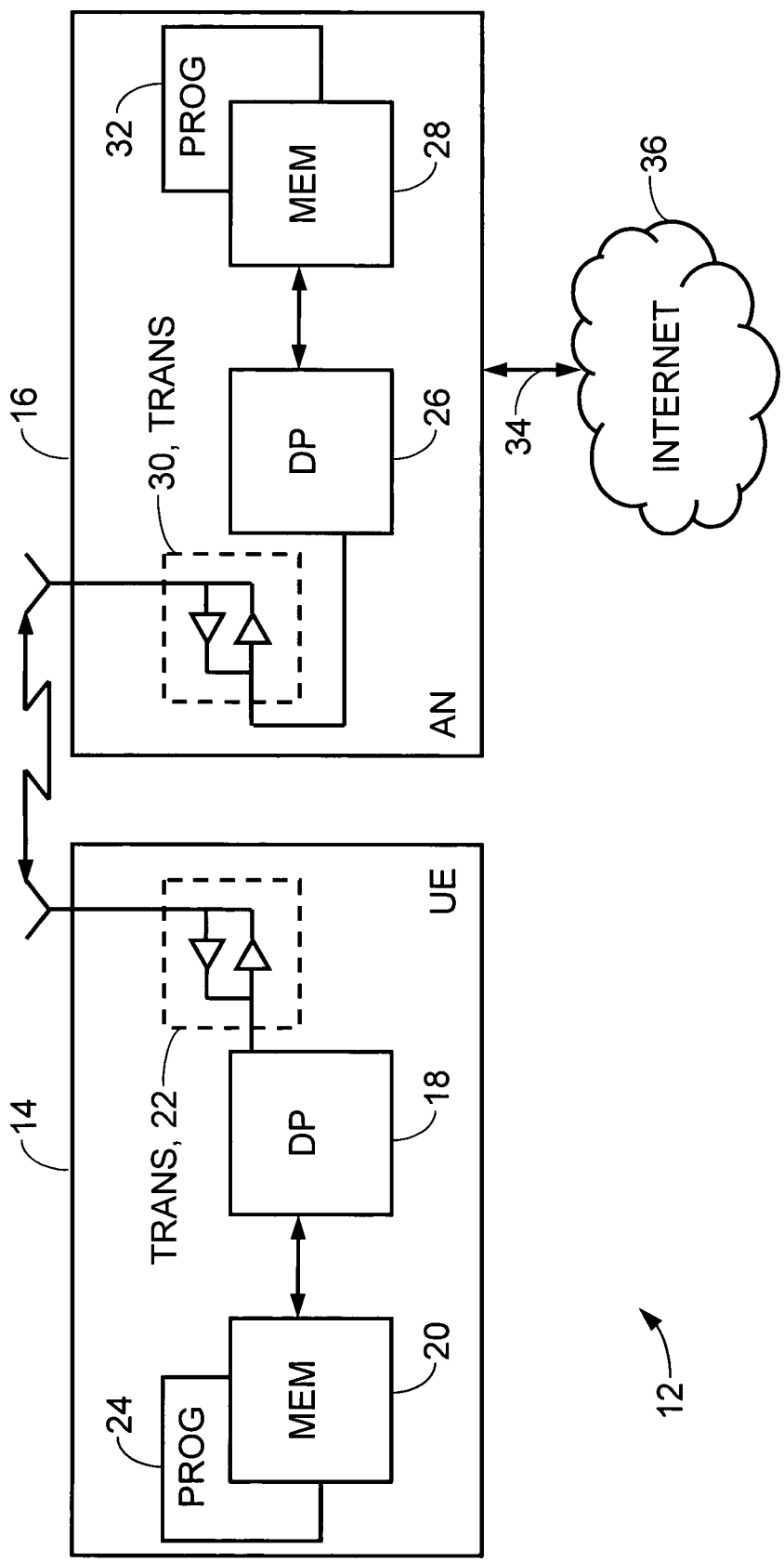
FIG. 8 shows a simplified block diagram of other electronic devices that are suitable for use in practicing the exemplary embodiments of this invention.

Although shown in FIG. 6 as having two transceivers and two antennas, the UE 614 and/or the AN 616 may comprise a different number of transceivers and/or antennas. As a non-limiting example, and as shown in FIG. 8 and further described below, the UE and AN may each comprise one transceiver and one antenna.

As noted above, it is possible for the DL AT to fail. In the event of a DL AT failure, if the Node B is unaware of the failure, various errors can occur. For example, the ACK/NACK associated with/by the DL AT would be missing from the given UL TTI because the UE would have missed the DL allocation and would therefore have no reason to include an ACK/NACK. Since the Node B is unaware of the failure, and thus unaware of the absence of the ACK/NACK, it is likely that the Node B will misinterpret the received signal. A DL ACK/NACK (A/N) DTX detector can be used to address this problem by providing an indication when A/N DTX occurs (i.e., to indicate whether or not the DL ACK/NACK is present). However, there is a risk that the A/N DTX detection itself fails.

There are two situations that may occur regarding A/N DTX detection failure: (AA) the DL AT fails and the A/N DTX detector fails (i.e., does not detect the DL AT failure); or (BB) the DL AT does not fail but the A/N DTX detector fails (e.g., a false alarm). The consequences of these two situations are considered below.

(AA) In this case, the UL data and CQI will be interpreted as an ACK/NACK. This is a significant error from the DL point of view, especially when UL data or CQI is interpreted as an ACK, because a transmission is erroneously assumed to be correct. Higher layers may have to be used to detect this and provide recovery. Such higher layer recovery is generally much slower than L1 recovery. This error should generally have a low probability of occurrence, even less than the above-mentioned 1%-5%. The UL data may also fail, for example, because the Node B may have made an incorrect assumption on the format used in the uplink (e.g., the Node B incorrectly assumed the ACK/NACK was multiplexed with data when it was not). While ARQ should eventually cure this, there may be a more serious issue with HARQ regarding soft buffer corruption. For HARQ, the initial packet is not discarded if it cannot be decoded. Instead, the data will be combined with subsequent packets. If the first packet was received or interpreted erroneously, this may also harm subsequent decoding of received packets.

(BB) In this case, the actually-transmitted ACK/NACK will not be considered as such by the Node B. Instead, the ACK/NACK resources may be interpreted as belonging to the data and/or CQI. This will likely cause an incorrect interpretation of the UL data and/or CQI and, consequently, they will likely fail (e.g., be lost).

In response to detecting an ACK/NACK DTX, the ACK/NACK can be: transmitted using CAZAC sequences, multiplexed with CQI (shared control/resources), multiplexed with UL data (dedicated resources) or multiplexed with CQI and UL data, as non-limiting examples. ACK/NACK DTX detection can be based, for example, on SNR measurement(s) (e.g., a threshold detector). Proper multiplexing design will likely increase DTX detection probability. Furthermore, a proper multiplexing design between UL data, CQI and ACK/NACK will likely increase the probability of maintaining the CQI and/or UL data reception in the event of a DTX detection failure.

While data-associated control signaling could be used to signal the actual transport format combination in the UL, this scheme may not be feasible for systems that do not have data-associated control signaling in the UL. For example, in the 3GPP, it has been decided that there is no data-associated control signaling in the UL for E-UTRAN. As such, other options and solutions should be considered.

There are several multiplexing issues that may have an impact on the performance of the A/N DTX detector. As non-limiting examples, one may consider how to multiplex ACK/NACK and CQI, how to multiplex ACK/NACK and UL data, and/or how to multiplex ACK/NACK, CQI and UL data.

Figure 7:
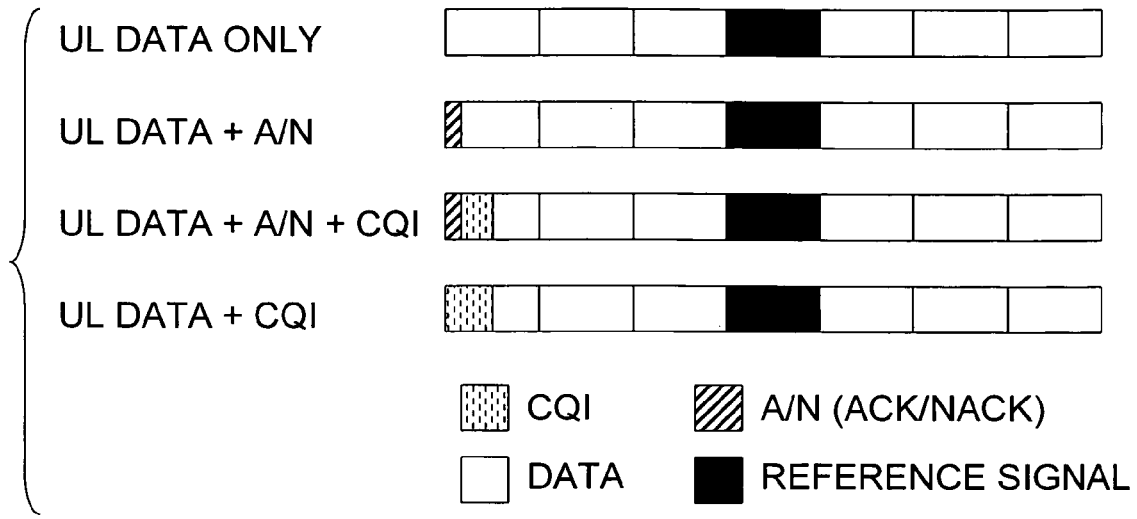
FIG. 7 depicts exemplary combinations of ACK/NACK and CQI as transmitted with UL data.

FIG. 7 depicts exemplary combinations of ACK/NACK and CQI as transmitted with UL data (e.g., multiplexed).

Proper multiplexing design between the UL data, CQI and ACK/NACK will increase the probability of maintaining the CQI and/or UL data reception in the event that an ACK/NACK is interpreted as a DTX. That is, having substantially similar CQI transmission both with and without an ACK/NACK will likely preserve CQI transmission when A/N DTX detection fails.

One option is to keep the CQI encoder unchanged and perform the extra repetition for pre-determined ACK/NACK bits (e.g., symbol-level multiplexing between ACK/NACK and CQI). However, with this option DTX detection may be difficult because the repeated CQI may be interpreted as an ACK/NACK.

Another option is to have substantially similar UL data transmission both with and without an ACK/NACK. This will only partially degrade the UL data reception when A/N DTX detection fails. Data rate-matching may be designed such that the UL data is self-decodable in case the UL data is interpreted as an ACK/NACK DTX. However, as in the first option, with this option DTX detection may be difficult because the repeated CQI may be interpreted as an ACK/NACK.

A third option is to design the CQI encoder scheme such that the cross-correlation between the ACK/NACK/DTX sequences is minimized. A fourth option is to design the CQI encoder such that repeated bits (e.g., during ACK/NACK DTX) have optimized cross-correlation with only the ACK sequence. However, these two options do not address the situation where an ACK/NACK is multiplexed with UL data (e.g., random UL data).

A fifth option is to always send an ACK/NACK when CQI and/or UL data is present. However, this approach increases overhead since a NACK will be transmitted, even when it is unnecessary.

A sixth option is to signal the ACK/NACK implicitly using the RS (e.g., one cyclic shift corresponds to ACK and another cyclic shift corresponds to NACK). The same principle could be used for both shared and dedicated resources. If ACK/NACK is not present, the cyclic shift corresponding to NACK could be selected. However, there are a few problems with this approach. First, it may be difficult to provide sufficient coverage for ACK/NACK as there are only two RS symbols per TTI. Second, an incorrect decision (e.g., cyclic shift) will cause some throughput loss for UL data transmission because channel estimation will be compromised. Third, an incorrect decision (e.g., cyclic shift) also may mean that a NACK is interpreted as an ACK or vice versa.

A seventh option to be used with the sixth option is to increase the number of RS symbols for UEs having coverage problems. This would likely decrease the probability of an incorrect decision (e.g., cyclic shift).

In another non-limiting, exemplary embodiment of the invention, an additional bit is included in the UL AT (e.g., sent in the DL from the Node B to the UE). This additional bit is used, for example, to inform the UE whether or not the corresponding DL AT was transmitted. That is, this additional bit is associated with the DL signaling of the UL resources and tells the UE whether or not the UE should use a bit field for ACK/NACK. The UL bit fields reserved may comprise a plurality of bits as opposed to a single bit, for example, depending on the MIMO mode. In this manner, if the UL AT is decoded successfully, the UE will automatically reserve a predetermined ACK/NACK field (said field comprising at least one bit) from the UL resource, even if the UE had missed (e.g., failed to receive) the corresponding DL AT. Note that furthermore, at least in this exemplary embodiment, the UE may respond to the additional bit with, for example, an ACK/NACK in the next UL message to the Node B. The ACK/NACK indicates the receipt or non-receipt of, for example, the DL AT by the UE. Furthermore, if the UE has not received the DL data allocation and, consequently, no DL data, in one exemplary embodiment, the UE sends a NACK indicating the non-receipt of the DL data.

A similar technique may be utilized to signal the presence or absence of non-periodic CQI in the UL AT. In such a case, it may be assumed that signaling of the periodic CQI is performed using higher layer signaling which is well-protected against errors.

In other exemplary embodiments, a portion of the DL control channel for the uplink allocation may be used to identify or define the format of the control channel in the uplink (e.g., the kind of transport format for the UL control signal). This exemplary embodiment may be utilized for any suitable UL control channel structure, including CQI, ACK/NACK and ACK/NACK for MIMO, as non-limiting examples.

Utilizing this exemplary aspect of the invention, it is beneficial to standardize the contents of the UL/DL AT.

Consider an exemplary case where the DL AT has failed and the UL AT was successfully decoded. In accordance with the exemplary embodiments of the invention, the UE may have three choices, numbered below:

(1) The UE transmits NACK on the predetermined ACK/NACK field.

(2) The UE transmits nothing (DTX) on the predetermined ACK/NACK resource.

(3) The UE transmits NACK on the predetermined ACK/NACK field, but with a lower power as compared to a "normal" NACK transmission (e.g., choice (1) above).

Choice (1) generally has better performance since the use of an A/N DTX detector can be avoided when UL data is present. Choice (2) may save transmission power due to fewer transmissions. However, DTX detection may be more preferable than the indication to include the ACK/NACK field because it avoids the situation where random data resembles an ACK/NACK and needs to be distinguished from an actual ACK/NACK. Furthermore, the data reception can no longer be compromised as there is no ambiguity as to whether the ACK/NACK field is used for data or for an ACK/NACK. Choice (3) generally may be viewed as a compromise between the other two choices.

Utilizing aspects of the exemplary embodiments of the invention, the robustness is increased for system (e.g., an E-UTRAN system) operation during DL AT failure. The UL data will not be misinterpreted as an ACK. Similarly, periodic CQI multiplexed with UL data will not be misinterpreted as an ACK. Failure of the A/N DTX detector no longer causes problems for UL data detection or detection of CQI transmitted with UL data.

Furthermore, the additional system overhead is relatively minor. Utilizing aspects of the exemplary embodiments of the invention, as few as one additional bit (i.e., at least one bit) is added to the UL AT. The additional bit(s) generally involves less overhead as compared to other conventional techniques. For example, where the presence or absence of an ACK/NACK is indicated using data-associated UL signaling, such UL signaling is avoided. In addition, since the additional bit(s) can be coded together with the rest of the UL AT, it may enjoy a coding gain. This is in contrast to a bit sent alone or with only a few other bits as only information in a data-associated UL signaling, which could not benefit from such a coding gain.

In other exemplary embodiments, the additional overhead caused by the pre-reserved DTX or NACK resource may be limited to the case where the UE is transmitting UL data during a failed DL allocation. In further exemplary embodiments, the ACK/NACK or DTX field(s) may always be reserved in case the corresponding DL allocation is absent. There may be a significant difference in system overhead between these approaches, particularly if the allocation seldom fails (e.g., less than 5% failure rate). Furthermore, UL signaling is typically more "expensive" than DL signaling.

The additional bit(s) for the UL AT would likely not be a concern since the size of the UL AT is on the order of 30-40 bits.

The overhead in the case of non-adaptive HARQ may be an issue. It is noted that, when using non-adaptive HARQ in the UL, the resource allocation for the re-transmissions can be based on as few as one bit (e.g., a NACK). It is also noted that non-adaptive HARQ may not be an acceptable solution for some systems, such as the E-UTRAN UL, for example, because of the disadvantages related to the DTX operation and the flexible spectrum usage. Even with these disadvantages, aspects of the exemplary embodiments of the invention may be utilized with non-adaptive HARQ. In such cases, a second additional bit may be sent with the aforementioned at least one additional bit (i.e., at least two bits are used).

Reference is made to FIG. 8 for illustrating a simplified block diagram of other electronic devices that are suitable for use in practicing the exemplary embodiments of this invention. In FIG. 8, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

(1) In one non-limiting, exemplary embodiment, and as illustrated in FIG. 5, a method comprising: detecting whether a first signal is received on a dedicated resource of a wireless communication system (501); detecting whether a second signal is received on a shared resource of the wireless communication system (502); and determining, based on a detection outcome for the first signal and a detection outcome for the second signal, whether at least one allocation has failed (503).

A method as above, wherein the at least one allocation comprises an uplink allocation. A method as in any above, wherein an uplink allocation table is indicative of the uplink allocation. A method as in any above, wherein the at least one allocation comprises a first allocation and a second allocation, the method further comprising: determining, based on the detection outcome for the first signal and the detection outcome for the second signal, whether the second allocation has failed. A method as in any above, wherein the first allocation comprises an uplink allocation and the second allocation comprises a downlink allocation. A method as in any above, wherein an uplink allocation table is indicative of the uplink allocation and a downlink allocation table is indicative of the downlink allocation. A method as in any above, wherein the second signal comprises a control signal. A method as in any above, wherein the method is implemented by a computer program. A method as in any above, wherein the method is implemented by a computer program stored on a computer-readable medium.

(2) In another non-limiting, exemplary embodiment, a program storage device readable by a machine, tangibly embodying a program of instructions executable by the machine for performing operations, said operations comprising: detecting whether a first signal is received on a dedicated resource of a wireless communication system (501); detecting whether a second signal is received on a shared resource of the wireless communication system (502); and determining, based on a detection outcome for the first signal and a detection outcome for the second signal, whether at least one allocation has failed (503).

A program storage device as above, wherein the at least one allocation comprises an uplink allocation. A program storage device as in any above, wherein an uplink allocation table is indicative of the uplink allocation. A program storage device as in any above, wherein the at least one allocation comprises a first allocation and a second allocation, the operations further comprising: determining, based on the detection outcome for the first signal and the detection outcome for the second signal, whether the second allocation has failed. A program storage device as in any above, wherein the first allocation comprises an uplink allocation and the second allocation comprises a downlink allocation. A program storage device as in any above, wherein an uplink allocation table is indicative of the uplink allocation and a downlink allocation table is indicative of the downlink allocation. A program storage device as in any above, wherein the second signal comprises a control signal. A program storage device as in any above, wherein the machine comprises a base station. A program storage device as in any above, wherein the machine comprises a node of an E-UTRAN system. A program storage device as in any above, wherein the machine comprises a base station of an E-UTRAN system.

(3) In another non-limiting, exemplary embodiment, an apparatus comprising: a first receiver; a first detector configured to detect whether a first signal is received by the first receiver on a dedicated resource; a second receiver; a second detector configured to detect whether a second control signal is received by the second receiver on a shared resource; and a data processor configured to determine, based on a detection outcome for the first signal and a detection outcome for the second control signal, whether at least one allocation has failed.

An apparatus as above, wherein the at least one allocation comprises an uplink allocation. An apparatus as in any above, wherein an uplink allocation table is indicative of the uplink allocation. An apparatus as in any above, wherein the at least one allocation comprises a first allocation and a second allocation, wherein the data processor is further configured to determine, based on the detection outcome for the first signal and the detection outcome for the second signal, whether the second allocation has failed. An apparatus as in any above, wherein the first allocation comprises an uplink allocation and the second allocation comprises a downlink allocation. An apparatus as in any above, wherein an uplink allocation table is indicative of the uplink allocation and a downlink allocation table is indicative of the downlink allocation. An apparatus as in any above, wherein the second signal comprises a control signal.

An apparatus as in any above, wherein the first receiver comprises the second receiver. An apparatus as in any above, wherein the first detector comprises the second detector. An apparatus as in any above, wherein the data processor comprises at least one of the first detector and the second detector. An apparatus as in any above, wherein the apparatus comprises a base station. An apparatus as in any above, wherein the apparatus comprises a node of an E-UTRAN system. An apparatus as in any above, wherein the apparatus comprises a base station of an E-UTRAN system.

(4) In another non-limiting, exemplary embodiment, an apparatus comprising: first means for receiving; first means for detecting whether a first signal is received on a dedicated resource by the first means for receiving; second means for receiving; second means for detecting whether a second control signal is received on a shared resource by the second means for receiving; and means for determining, based on a detection outcome for the first signal and a detection outcome for the second control signal, whether at least one allocation has failed.

An apparatus as above, wherein the at least one allocation comprises an uplink allocation. An apparatus as in any above, wherein an uplink allocation table is indicative of the uplink allocation. An apparatus as in any above, wherein the at least one allocation comprises a first allocation and a second allocation, wherein the means for determining is further for determining, based on the detection outcome for the first signal and the detection outcome for the second signal, whether the second allocation has failed. An apparatus as in any above, wherein the first allocation comprises an uplink allocation and the second allocation comprises a downlink allocation. An apparatus as in any above, wherein an uplink allocation table is indicative of the uplink allocation and a downlink allocation table is indicative of the downlink allocation. An apparatus as in any above, wherein the second signal comprises a control signal.

An apparatus as in any above, wherein the first means for receiving comprises a receiver. An apparatus as in any above, wherein the second means for receiving comprises a receiver. An apparatus as in any above, wherein the means for determining comprises a data processor. An apparatus as in any above, wherein the first means for detecting comprises a detector. An apparatus as in any above, wherein the second means for detecting comprises a detector. An apparatus as in any above, wherein the first means for receiving comprises the second means for receiving. An apparatus as in any above, wherein the first means for detecting comprises the second means for detecting. An apparatus as in any above, wherein the means for determining comprises at least one of the first means for detecting and the second means for detecting. An apparatus as in any above, wherein the electronic device comprises a base station. An apparatus as in any above, wherein the apparatus comprises a node of an E-UTRAN system. An apparatus as in any above, wherein the apparatus comprises a base station of an E-UTRAN system.

Figure 9:
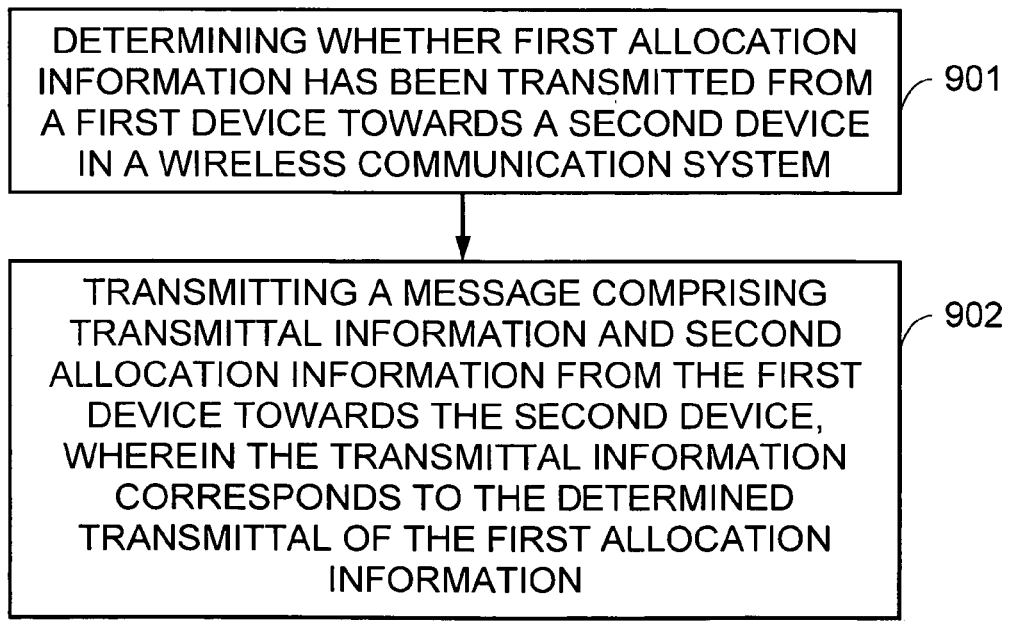
FIG. 9 depicts a flowchart illustrating another non-limiting example of a method for practicing the exemplary embodiments of this invention.

(5) In another non-limiting, exemplary embodiment, and as illustrated in FIG. 9, a method comprising: determining whether first allocation information has been transmitted from a first device towards a second device in a wireless communication system (901); and transmitting a message comprising transmittal information and second allocation information from the first device towards the second device, wherein the transmittal information corresponds to the determined transmittal of the first allocation information (902).

A method as above, wherein the second allocation information comprises the transmittal information. A method as in any above, wherein the transmittal information consists of one bit. A method as in any above, wherein the transmittal information comprises a plurality of bits. A method as in any above, wherein the transmittal information comprises at least one bit. A method as in any above, wherein the second allocation information comprises uplink allocation information. A method as in any above, wherein the uplink allocation information comprises an uplink allocation table. A method as in any above, wherein the transmittal information comprises at least one bit in the uplink allocation table. A method as in any above, wherein the first allocation information comprises downlink allocation information. A method as in any above, wherein the downlink allocation information comprises a downlink allocation table. A method as in any above, wherein the transmittal information comprises one bit for each constituent signal of a MIMO transmission. A method as in any above, wherein the method is implemented by a computer program. A method as in any above, wherein the method is implemented by a computer program stored on a computer-readable medium. A method as in any above, wherein the wireless communication system comprises an evolved universal terrestrial radio access network.

(6) In another non-limiting, exemplary embodiment, a program storage device readable by a machine, tangibly embodying a program of instructions executable by the machine for performing operations, said operations comprising: determining whether first allocation information has been transmitted from a first device towards a second device in a wireless communication system (901); and transmitting a message comprising transmittal information and second allocation information from the first device towards the second device, wherein the transmittal information corresponds to the determined transmittal of the first allocation information (902).

A program storage device as above, wherein the second allocation information comprises the transmittal information. A program storage device as in any above, wherein the transmittal information consists of one bit. A program storage device as in any above, wherein the transmittal information comprises a plurality of bits. A program storage device as in any above, wherein the transmittal information comprises at least one bit. A program storage device as in any above, wherein the second allocation information comprises uplink allocation information. A program storage device as in any above, wherein the uplink allocation information comprises an uplink allocation table. A program storage device as in any above, wherein the transmittal information comprises at least one bit in the uplink allocation table. A program storage device as in any above, wherein the first allocation information comprises downlink allocation information. A program storage device as in any above, wherein the downlink allocation information comprises a downlink allocation table. A program storage device as in any above, wherein the transmittal information comprises one bit for each constituent signal of a MIMO transmission. A program storage device as in any above, wherein the machine comprises a base station. A program storage device as in any above, wherein the machine comprises a node of an E-UTRAN system. A program storage device as in any above, wherein the machine comprises a base station of an E-UTRAN system.

(7) In another non-limiting, exemplary embodiment, an apparatus comprising: a data processor configured to determine whether first allocation information has been transmitted towards another apparatus; and a transmitter configured to transmit a message comprising transmittal information and second allocation information towards the other apparatus, wherein the transmittal information corresponds to the determined transmittal of the first allocation information.

An apparatus as above, wherein the second allocation information comprises the transmittal information. An apparatus as in any above, wherein the transmittal information consists of one bit. An apparatus as in any above, wherein the transmittal information comprises a plurality of bits. An apparatus as in any above, wherein the transmittal information comprises at least one bit. An apparatus as in any above, wherein the second allocation information comprises uplink allocation information. An apparatus as in any above, wherein the uplink allocation information comprises an uplink allocation table. An apparatus as in any above, wherein the transmittal information comprises at least one bit in the uplink allocation table. An apparatus as in any above, wherein the first allocation information comprises downlink allocation information. An apparatus as in any above, wherein the downlink allocation information comprises a downlink allocation table. An apparatus as in any above, wherein the transmittal information comprises one bit for each constituent signal of a MIMO transmission.

An apparatus as in any above, wherein the apparatus comprises a base station. An apparatus as in any above, wherein the apparatus comprises a node of an E-UTRAN system. An apparatus as in any above, wherein the apparatus comprises a base station of an E-UTRAN system. An apparatus as in any above, further comprising a receiver. An apparatus as in any above, wherein the transmitter comprises a transceiver.

(8) In another non-limiting, exemplary embodiment, an apparatus comprising: means for determining whether first allocation information has been transmitted towards another apparatus in a wireless communication system; and means for transmitting a message comprising transmittal information and second allocation information towards the other apparatus, wherein the transmittal information corresponds to the determined transmittal of the first allocation information.

An apparatus as above, wherein the second allocation information comprises the transmittal information. An apparatus as in any above, wherein the transmittal information consists of one bit. An apparatus as in any above, wherein the transmittal information comprises a plurality of bits. An apparatus as in any above, wherein the transmittal information comprises at least one bit. An apparatus as in any above, wherein the second allocation information comprises uplink allocation information. An apparatus as in any above, wherein the uplink allocation information comprises an uplink allocation table. An apparatus as in any above, wherein the transmittal information comprises at least one bit in the uplink allocation table. An apparatus as in any above, wherein the first allocation information comprises downlink allocation information. An apparatus as in any above, wherein the downlink allocation information comprises a downlink allocation table. An apparatus as in any above, wherein the transmittal information comprises one bit for each constituent signal of a MIMO transmission.

An apparatus as in any above, wherein the apparatus comprises a base station. An apparatus as in any above, wherein the apparatus comprises a node of an E-UTRAN system. An apparatus as in any above, wherein the apparatus comprises a base station of an E-UTRAN system. An apparatus as in any above, further comprising a receiver. An apparatus as in any above, wherein the transmitter comprises a transceiver. An apparatus as in any above, wherein the means for determining comprises a data processor. An apparatus as in any above, wherein the means for transmitting comprises a transmitter. An apparatus as in any above, further comprising: means for generating the message. An apparatus as in any above, wherein the means for determining comprises the means for generating.

(9) In another non-limiting, exemplary embodiment, a method comprising: detecting whether a first signal is received on a dedicated resource of a wireless communication system; detecting whether a second signal is received on a shared resource of the wireless communication system; determining, based on the detected first signal and the detected second signal, whether at least one allocation has failed; determining whether first allocation information has been transmitted from a first device towards a second device in the wireless communication system; transmitting a message comprising transmittal information and second allocation information from the first device towards the second device, wherein the transmittal information corresponds to the determined transmittal of the first allocation information. A method as in the previous, further comprising one or more aspects of the exemplary embodiments of the invention as described elsewhere herein.

Figure 10:
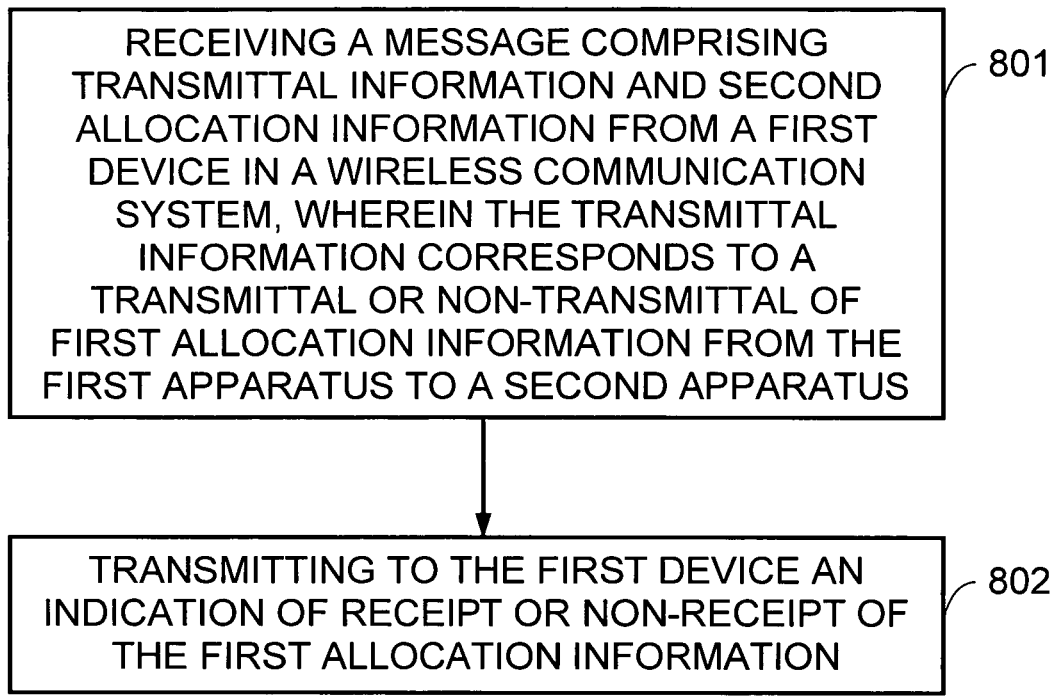
FIG. 10 shows a flowchart illustrating another non-limiting example of a method for practicing the exemplary embodiments of this invention.

(10) In another non-limiting, exemplary embodiment, and as illustrated in FIG. 10, a method comprising: receiving a message comprising transmittal information and second allocation information from a first apparatus in a wireless communication system, wherein the transmittal information corresponds to a transmittal or non-transmittal of first allocation information from the first apparatus to a second apparatus (801); and transmitting to the first apparatus an indication of receipt or non-receipt of the first allocation information (802).

A method as above, wherein the second allocation information comprises the transmittal information. A method as in any above, wherein the transmittal information consists of one bit. A method as in any above, wherein the transmittal information comprises a plurality of bits. A method as in any above, wherein the transmittal information comprises at least one bit. A method as in any above, wherein the second allocation information comprises uplink allocation information. A method as in any above, wherein the uplink allocation information comprises an uplink allocation table. A method as in any above, wherein the transmittal information comprises at least one bit in the uplink allocation table. A method as in any above, wherein the first allocation information comprises downlink allocation information. A method as in any above, wherein the downlink allocation information comprises a downlink allocation table. A method as in any above, wherein the transmittal information comprises one bit for each constituent signal of a MIMO transmission. A method as in any above, wherein the method is implemented by a computer program. A method as in any above, wherein the method is implemented by a computer program stored on a computer-readable medium.

A method as in any above, further comprising: determining whether the first allocation information has been received. A method as in any above, wherein the indication of receipt or non-receipt comprises an acknowledgement or a negative acknowledgement. A method as in any above, wherein the indication of receipt comprises an acknowledgement. A method as in any above, wherein the indication of non-receipt comprises a negative acknowledgement. A method as in any above, wherein the indication of receipt or non-receipt is transmitted in an uplink message to the first apparatus. A method as in any above, wherein the method is performed by the second apparatus. A method as in any above, wherein the second apparatus comprises a mobile terminal, a mobile device, a mobile node or a user equipment. A method as in any above, wherein the first apparatus comprises a base station, a relay node or a network node. A method as in any above, wherein the wireless communication system comprises an evolved universal terrestrial radio access network.

(11) In another non-limiting, exemplary embodiment, a program storage device readable by a machine, tangibly embodying a program of instructions executable by the machine for performing operations, said operations comprising: receiving a message comprising transmittal information and second allocation information from a first apparatus in a wireless communication system, wherein the transmittal information corresponds to a transmittal or non-transmittal of first allocation information from the first apparatus to a second apparatus (801); and transmitting to the first apparatus an indication of receipt or non-receipt of the first allocation information (802).

A program storage device as above, wherein the second allocation information comprises the transmittal information. A program storage device as in any above, wherein the transmittal information consists of one bit. A program storage device as in any above, wherein the transmittal information comprises a plurality of bits. A program storage device as in any above, wherein the transmittal information comprises at least one bit. A program storage device as in any above, wherein the second allocation information comprises uplink allocation information. A program storage device as in any above, wherein the uplink allocation information comprises an uplink allocation table. A program storage device as in any above, wherein the transmittal information comprises at least one bit in the uplink allocation table. A program storage device as in any above, wherein the first allocation information comprises downlink allocation information. A program storage device as in any above, wherein the downlink allocation information comprises a downlink allocation table. A program storage device as in any above, wherein the transmittal information comprises one bit for each constituent signal of a MIMO transmission. A program storage device as in any above, wherein the machine comprises a mobile terminal, a mobile station, a mobile node or a user equipment. A program storage device as in any above, wherein the machine comprises a node of an E-UTRAN system. A program storage device as in any above, wherein the machine comprises a mobile node of an E-UTRAN system.

A program storage device as in any above, said operations further comprising: determining whether the first allocation information has been received. A program storage device as in any above, wherein the indication of receipt or non-receipt comprises an acknowledgement or a negative acknowledgement. A program storage device as in any above, wherein the indication of receipt comprises an acknowledgement. A program storage device as in any above, wherein the indication of non-receipt comprises a negative acknowledgement. A program storage device as in any above, wherein the indication of receipt or non-receipt is transmitted in an uplink message to the first apparatus. A program storage device as in any above, wherein the machine comprises the second apparatus. A program storage device as in any above, wherein the second apparatus comprises a mobile terminal, a mobile device, a mobile node or a user equipment. A program storage device as in any above, wherein the first apparatus comprises a base station, a relay node or a network node. A program storage device as in any above, wherein the wireless communication system comprises an evolved universal terrestrial radio access network.

(12) An apparatus comprising: a receiver configured to receive a message comprising transmittal information and second allocation information from another apparatus in a wireless communication system, wherein the transmittal information corresponds to a transmittal or non-transmittal of first allocation information from the other apparatus to the apparatus; and a transmitter configured to transmit to the other apparatus an indication of receipt or non-receipt of the first allocation information.

An apparatus as above, wherein the second allocation information comprises the transmittal information. An apparatus as in any above, wherein the transmittal information consists of one bit. An apparatus as in any above, wherein the transmittal information comprises a plurality of bits. An apparatus as in any above, wherein the transmittal information comprises at least one bit. An apparatus as in any above, wherein the second allocation information comprises uplink allocation information. An apparatus as in any above, wherein the uplink allocation information comprises an uplink allocation table. An apparatus as in any above, wherein the transmittal information comprises at least one bit in the uplink allocation table. An apparatus as in any above, wherein the first allocation information comprises downlink allocation information. An apparatus as in any above, wherein the downlink allocation information comprises a downlink allocation table. An apparatus as in any above, wherein the transmittal information comprises one bit for each constituent signal of a MIMO transmission.

An apparatus as in any above, wherein the apparatus comprises a mobile terminal, a mobile device, a mobile node or a user equipment. An apparatus as in any above, wherein the apparatus comprises a node of an E-UTRAN system. An apparatus as in any above, wherein the apparatus comprises a user equipment of an E-UTRAN system. An apparatus as in any above, wherein the transmitter comprises a transceiver. An apparatus as in any above, wherein the receiver comprises a transceiver.

An apparatus as in any above, further comprising: a processor configured to determine whether the first allocation information has been received by the apparatus. An apparatus as in any above, wherein the indication of receipt or non-receipt comprises an acknowledgement or a negative acknowledgement. An apparatus as in any above, wherein the indication of receipt comprises an acknowledgement. An apparatus as in any above, wherein the indication of non-receipt comprises a negative acknowledgement. An apparatus as in any above, wherein the indication of receipt or non-receipt is transmitted in an uplink message to the other apparatus. An apparatus as in any above, wherein the other apparatus comprises a base station, a relay node or a network node. An apparatus as in any above, wherein the wireless communication system comprises an evolved universal terrestrial radio access network.

(13) An apparatus comprising: means for receiving a message comprising transmittal information and second allocation information from another apparatus in a wireless communication system, wherein the transmittal information corresponds to a transmittal or non-transmittal of first allocation information from the other apparatus to the apparatus; and means for transmitting to the other apparatus an indication of receipt or non-receipt of the first allocation information.

An apparatus as above, wherein the second allocation information comprises the transmittal information. An apparatus as in any above, wherein the transmittal information consists of one bit. An apparatus as in any above, wherein the transmittal information comprises a plurality of bits. An apparatus as in any above, wherein the transmittal information comprises at least one bit. An apparatus as in any above, wherein the second allocation information comprises uplink allocation information. An apparatus as in any above, wherein the uplink allocation information comprises an uplink allocation table. An apparatus as in any above, wherein the transmittal information comprises at least one bit in the uplink allocation table. An apparatus as in any above, wherein the first allocation information comprises downlink allocation information. An apparatus as in any above, wherein the downlink allocation information comprises a downlink allocation table. An apparatus as in any above, wherein the transmittal information comprises one bit for each constituent signal of a MIMO transmission.

An apparatus as in any above, wherein the apparatus comprises a mobile terminal, a mobile device, a mobile node or a user equipment. An apparatus as in any above, wherein the apparatus comprises a node of an E-UTRAN system. An apparatus as in any above, wherein the apparatus comprises a user equipment of an E-UTRAN system. An apparatus as in any above, wherein the means for transmitting comprises a transmitter or a transceiver. An apparatus as in any above, wherein the means for receiving comprises a receiver or a transceiver.

An apparatus as in any above, further comprising: means for determining whether the first allocation information has been received by the apparatus. An apparatus as in any above, wherein the means for determining comprises a processor. An apparatus as in any above, wherein the indication of receipt or non-receipt comprises an acknowledgement or a negative acknowledgement. An apparatus as in any above, wherein the indication of receipt comprises an acknowledgement. An apparatus as in any above, wherein the indication of non-receipt comprises a negative acknowledgement. An apparatus as in any above, wherein the indication of receipt or non-receipt is transmitted in an uplink message to the other apparatus. An apparatus as in any above, wherein the other apparatus comprises a base station, a relay node or a network node. An apparatus as in any above, wherein the wireless communication system comprises an evolved universal terrestrial radio access network.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, while discussed above primarily with respect to a Node B (base station), it should be appreciated that the exemplary embodiments of the invention are not limited for use with only this one particular type of device, and that they may be used to advantage in other devices. Similarly, while described above with respect to signaling in the uplink and downlink, it should be appreciated that the exemplary embodiments of the invention are not limited for use with only these specific directions or types of signaling, and that they may be used to advantage for different types of signaling and/or in different directions.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
    determining, by a first device, whether downlink allocation information has been transmitted from the first device towards a second device in a wireless communication system, wherein the downlink allocation information comprises a downlink allocation table; and
    transmitting a message comprising transmittal information and uplink allocation information from the first device towards the second device, wherein the uplink allocation information comprises an uplink allocation table, and wherein the transmittal information indicates whether the downlink allocation information has been transmitted.

2. A method as in claim 1, wherein the uplink allocation information comprises the transmittal information.

3. A method as in claim 1, wherein the transmittal information comprises at least one bit.

4. A method as in claim 3, wherein the transmittal information comprises at least one bit in the uplink allocation table.

5. A method as in claim 1, wherein the transmittal information comprises one bit for each constituent signal of a multiple input/multiple output (MIMO) transmission.

6. A non-transitory computer readable medium tangibly embodying a computer program executable by a processor to perform operations, said operations comprising:
    determining whether downlink allocation information has been transmitted from a first device towards a second device in a wireless communication system, wherein the downlink allocation information comprises a downlink allocation table; and
    transmitting a message comprising transmittal information and uplink allocation information from the first device towards the second device, wherein the uplink allocation information comprises an uplink allocation table, and wherein the transmittal information indicates whether the downlink allocation information has been transmitted.

7. A computer readable medium as in claim 6, wherein the transmittal information comprises at least one bit in the uplink allocation table.

8. An apparatus comprising at least one processor; and at least one memory including computer program code, the at least one memory and the computer program code configured to, with the at least one processor, cause the apparatus to perform at least the following:
    to determine whether downlink allocation information has been transmitted towards another apparatus, wherein the downlink allocation information comprises a downlink allocation table; and
    to transmit a message comprising transmittal information and uplink allocation information towards the other apparatus, wherein the uplink allocation information comprises an uplink allocation table, and wherein the transmittal information indicates whether the downlink allocation information has been transmitted.

9. An apparatus as in claim 8, wherein the uplink allocation information comprises the transmittal information.

10. An apparatus as in claim 8, wherein the transmittal information comprises at least one bit.

11. An apparatus as in claim 8, wherein the transmittal information comprises at least one bit in the uplink allocation table.

12. An apparatus as in claim 8, wherein the transmittal information comprises one bit for each constituent signal of a multiple input/multiple output (MIMO) transmission.

13. An apparatus as in claim 8, wherein the apparatus comprises a base station.

14. A method comprising:
    detecting whether a downlink allocation signal, comprising a downlink access table, from a first device is received at a second device on a dedicated resource of a wireless communication system;
    detecting whether an uplink allocation signal, comprising an uplink access table, from the first device is received at the second device on a shared resource of the wireless communication system; and
    determining, based on a detection outcome for the downlink allocation signal and a detection outcome for the uplink allocation signal, whether at least one allocation for the first device has failed.

15. A method as in claim 14, wherein the at least one allocation comprises an uplink allocation.

16. A method as in claim 15, wherein the uplink allocation table is indicative of the uplink allocation.

17. A method as in claim 14, wherein the at least one allocation comprises a first allocation and a second allocation, the method further comprising: determining, based on the detection outcome for the downlink allocation signal and the detection outcome for the uplink allocation signal, whether the second allocation has failed.

18. A method as in claim 17, wherein the first allocation comprises an uplink allocation and the second allocation comprises a downlink allocation.

19. A method as in claim 18, wherein uplink allocation table is indicative of the uplink allocation and a downlink allocation table is indicative of the downlink allocation.

20. A method as in claim 14, wherein the uplink allocation signal comprises a control signal.

21. The method of claim 14, where, in response to detecting that the downlink allocation signal was not received on the dedicated resource and detecting that the uplink allocation signal was received on the shared resource, a determination is made that an uplink allocation for the first device has failed.

22. The method of claim 14, where, in response to detecting that the downlink allocation signal was not received on the dedicated resource and detecting that the uplink allocation signal was not received on the shared resource, a determination is made that an uplink allocation for the first device has failed and a downlink allocation for the first device has failed.

23. A non-transitory computer readable medium tangibly embodying a computer program executable by a processor to perform operations, said operations comprising:
    detecting whether a downlink allocation signal, comprising a downlink access table, from a first device is received at a second device on a dedicated resource of a wireless communication system;
    detecting whether an uplink allocation signal, comprising an uplink access table, from the first device is received at the second device on a shared resource of the wireless communication system; and
    determining, based on a detection outcome for the downlink allocation signal and a detection outcome for the uplink allocation signal, whether at least one allocation for the first device has failed.

24. A computer readable medium as in claim 23, wherein the at least one allocation comprises an uplink allocation, wherein the uplink allocation table is indicative of the uplink allocation.

25. An apparatus comprising at least one processor; and at least one memory including computer program code, the at least one memory and the computer program code configured to, with the at least one processor, cause the apparatus to perform at least the following:
    to detect whether a downlink allocation signal, comprising a downlink access table, from a first device is received by the apparatus on a dedicated resource;
    to detect whether an uplink allocation signal, comprising an uplink access table, from the first device is received by the apparatus on a shared resource; and
    to determine, based on a detection outcome for the downlink allocation signal and a detection outcome for the uplink allocation signal, whether at least one allocation for the first device has failed.

26. An apparatus as in claim 25, wherein the at least one allocation comprises an uplink allocation.

27. An apparatus as in claim 25, wherein the at least one allocation comprises a first allocation and a second allocation, wherein the at least one memory and the computer program code are further configured to cause the apparatus to determine, based on the detection outcome for the downlink allocation signal and the detection outcome for the uplink allocation signal, whether the second allocation has failed.

28. An apparatus as in claim 27, wherein the first allocation comprises an uplink allocation and the second allocation comprises a downlink allocation.

29. An apparatus as in claim 25, wherein the uplink allocation signal comprises a control signal.

30. An apparatus as in claim 25, wherein the apparatus is embodied in an integrated circuit.

31. An apparatus as in claim 25, wherein the apparatus comprises a base station.

* * * * *